(12) United States Patent
Diaz

(10) Patent No.: US 6,816,778 B2
(45) Date of Patent: Nov. 9, 2004

(54) EVENT FINDER WITH NAVIGATION SYSTEM AND DISPLAY METHOD THEREOF

(75) Inventor: Melvin Diaz, La Palma, CA (US)

(73) Assignee: Alpine Electronics, Inc, Tokyo (JP)

(*) Notice: Subject to any disclaimer, the term of this patent is extended or adjusted under 35 U.S.C. 154(b) by 0 days.

(21) Appl. No.: 10/036,973

(22) Filed: Dec. 29, 2001

(65) Prior Publication Data

US 2004/0204820 A1 Oct. 14, 2004

(51) Int. Cl.⁷ .......................... G01C 21/00; H03M 7/40
(52) U.S. Cl. .................. 701/200; 701/201; 701/204; 701/208; 73/178 R; 340/988; 340/989; 340/991; 340/993; 340/995
(58) Field of Search ................. 701/200, 201, 701/204, 208; 73/178 R; 340/988, 989, 991, 993, 995

(56) References Cited

U.S. PATENT DOCUMENTS

| | | |
|---|---|---|
| 5,926,108 A | 7/1999 | Wicks et al. |
| 6,078,348 A | 6/2000 | Klosterman et al. |
| 6,119,095 A | 9/2000 | Morita |
| 6,154,689 A | 11/2000 | Pereira et al. |
| 6,191,782 B1 | 2/2001 | Mori et al. |
| 6,202,008 B1 | 3/2001 | Becker et al. |
| 6,430,498 B1 | 8/2002 | Maruyama et al. |
| 6,446,004 B1 * | 9/2002 | Cao et al. .................. 701/213 |
| 6,484,093 B1 | 11/2002 | Ito et al. |
| 6,523,061 B1 * | 2/2003 | Halverson et al. .......... 709/202 |
| 6,580,999 B2 * | 6/2003 | Maruyama et al. ......... 701/200 |

FOREIGN PATENT DOCUMENTS

| | | |
|---|---|---|
| JP | 9-257501 | 10/1997 |
| JP | 2001-183154 | 7/2001 |

* cited by examiner

*Primary Examiner*—Thomas G. Black
*Assistant Examiner*—Olga Hernandez
(74) *Attorney, Agent, or Firm*—Muramatsu & Associates

(57) ABSTRACT

An event finder on a remote terminal for finding events such as movies, sports, weather, news and the like through a remote terminal such as a lap top computer, personal digital assistant (PDA) and vehicle navigation system with positioning capability. The event finder includes a display, a data terminal connected to the display for processing data, a navigation system for determining position of a user and a destination, and a transceiver for receiving event data from an event data server through a public communication system. The event data server is a service provider which provides event information including schedules of events to subscribed members of unlimited number. The data terminal associates the event data from the event data server with position information from the navigation system and retrieves event information based on a selection method specified by the user.

16 Claims, 15 Drawing Sheets

FIG. 7

90 Database Entry

| Title | [X-Men] (Mission Impossible 2, Hollow Man, Pokemon, etc.) |
|---|---|
| Rating | [PG-13] (G, PG, PG-13, R, NC-17, etc.) |
| Start Times | [12:10, 2:40, 5:10, 6:45, 7:15, 7:55, 9:30, 10:05, 10:40] (indicate matinee/twilight times) |
| Run Time | [122 minutes] |
| Theater Info | [AMC Fullerton 20, 1001 S. Lemon, Fullerton, CA, 714-992-6000] |
| Ticket Pricing | [Adults $8.50, Children $5.00, Seniors $5.00, Matinee $5.50] (Ticket Pricing and Pass Restrictions) |
| Movie Summary | ["Based on the long-running Marvel comic book series, X-MEN takes place in the near future, as certain humans are evolving into..."] (Character limit dependent upon communications bandwidth constraints) |
| Special Notes | ["Starring: Hugh Jackman, Patrick Stewart, Ian McKellen, Famke Janssen and James Marsden. Released 7/20/00"] |
| Movie Ranking | [1] (ranks movie attendance, updated weekly) |

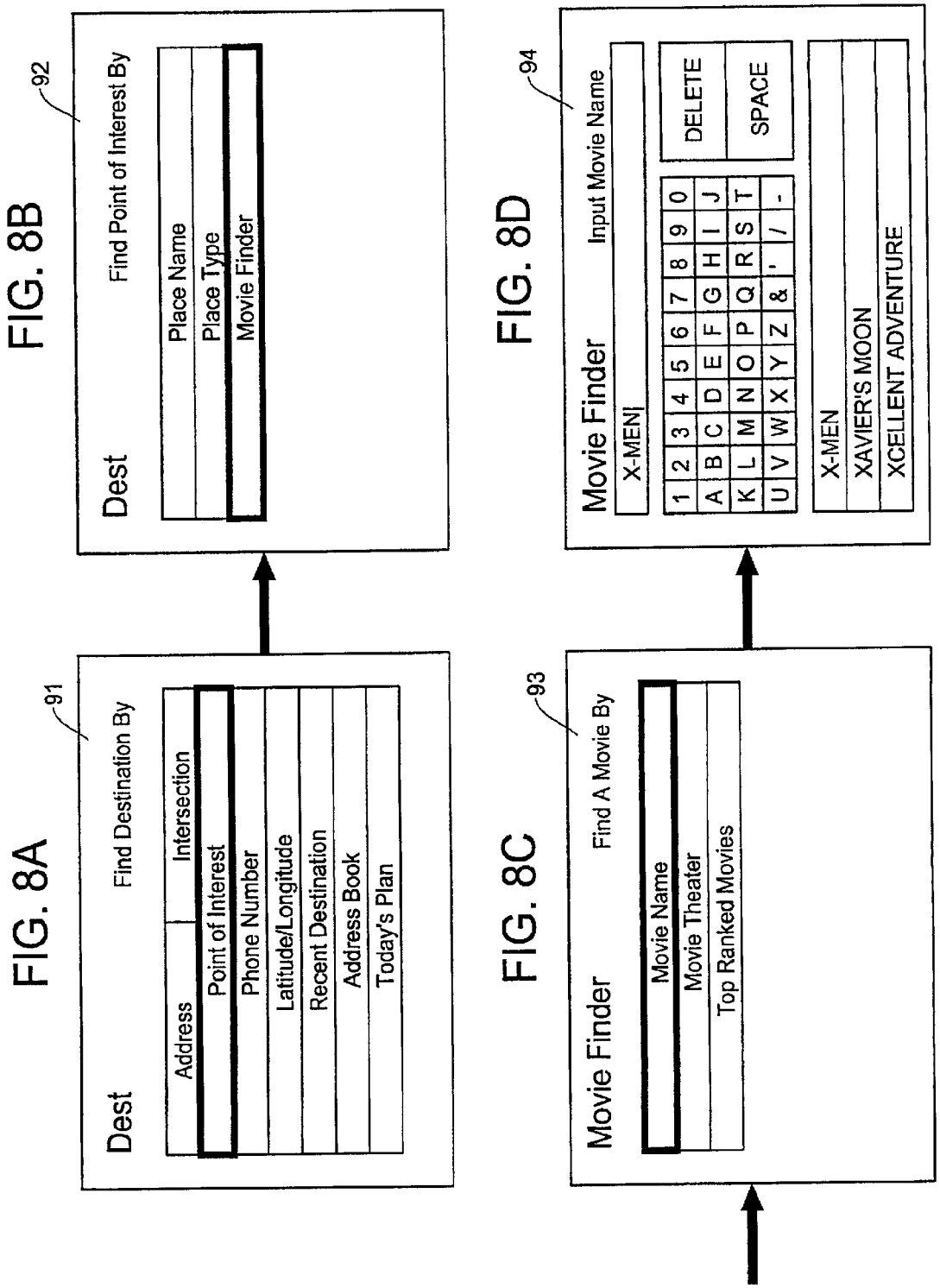

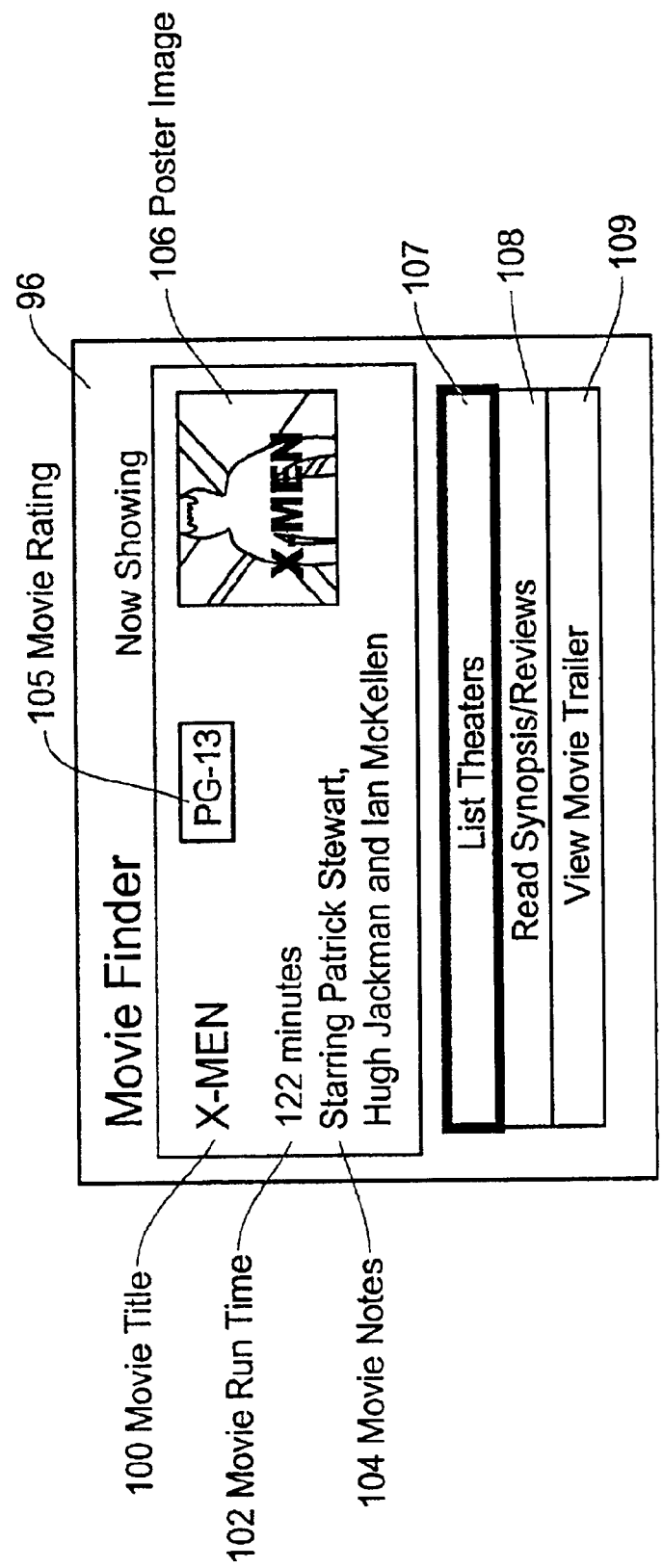

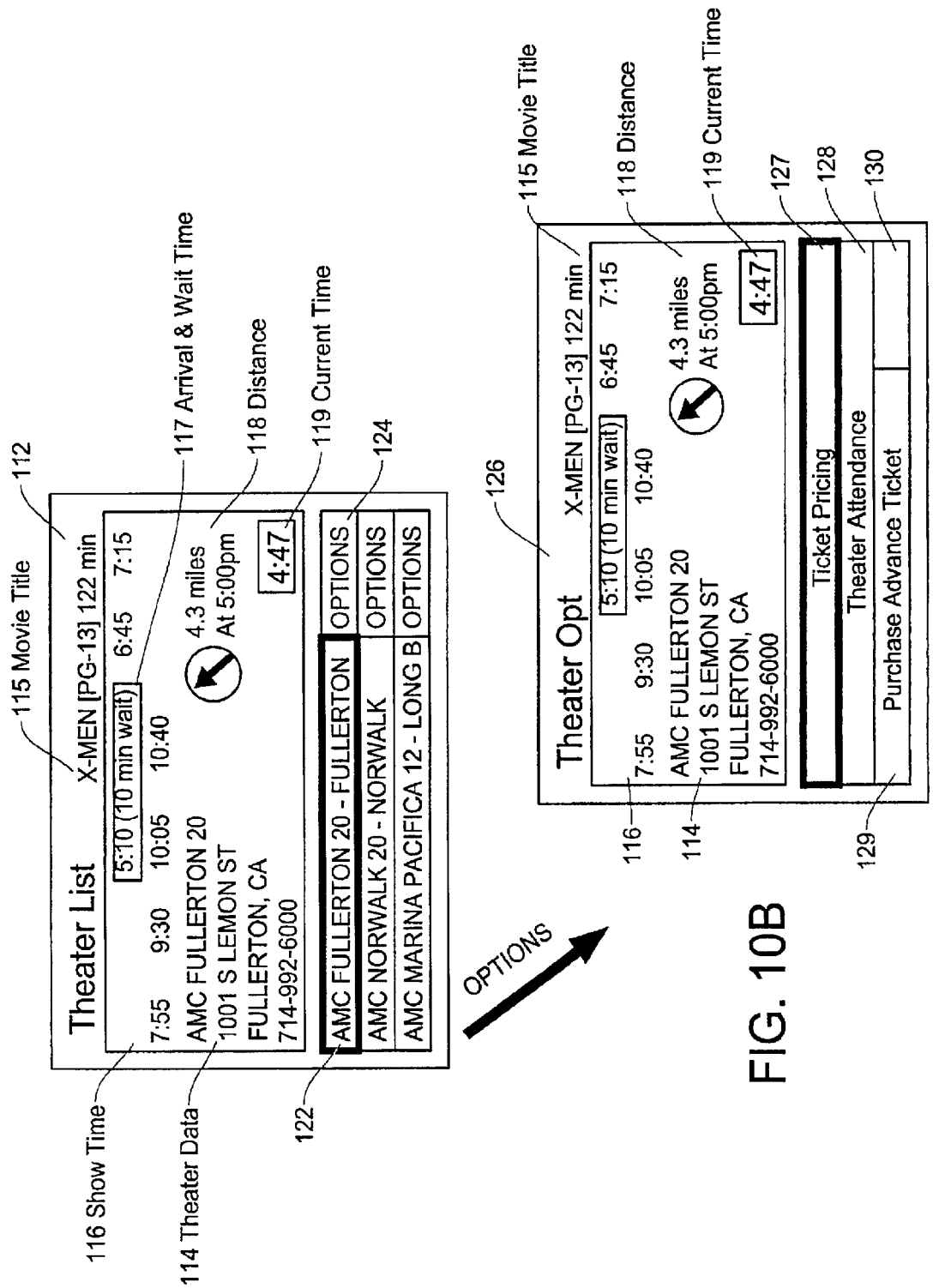

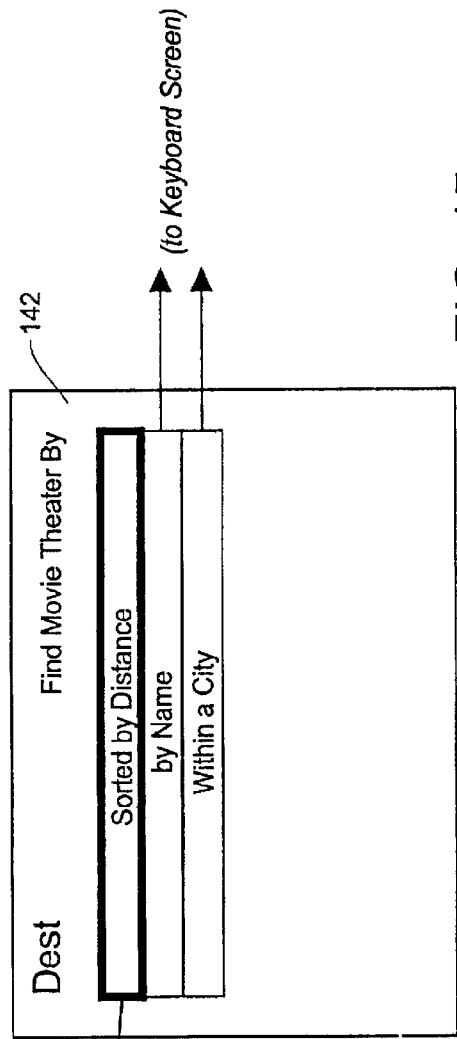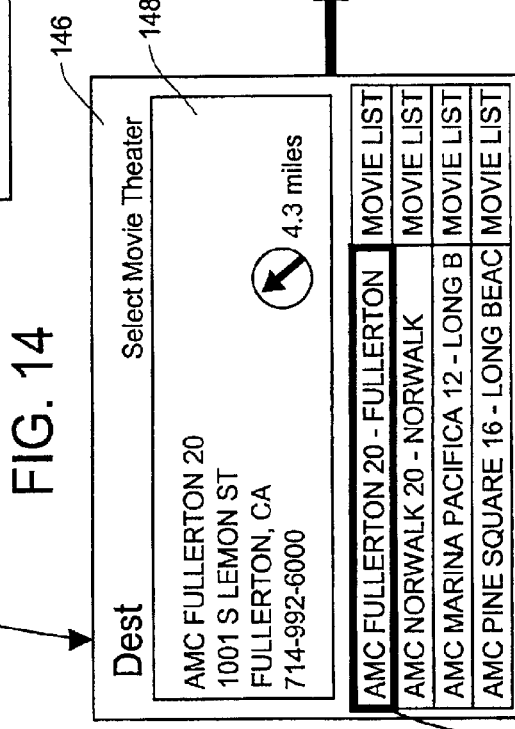

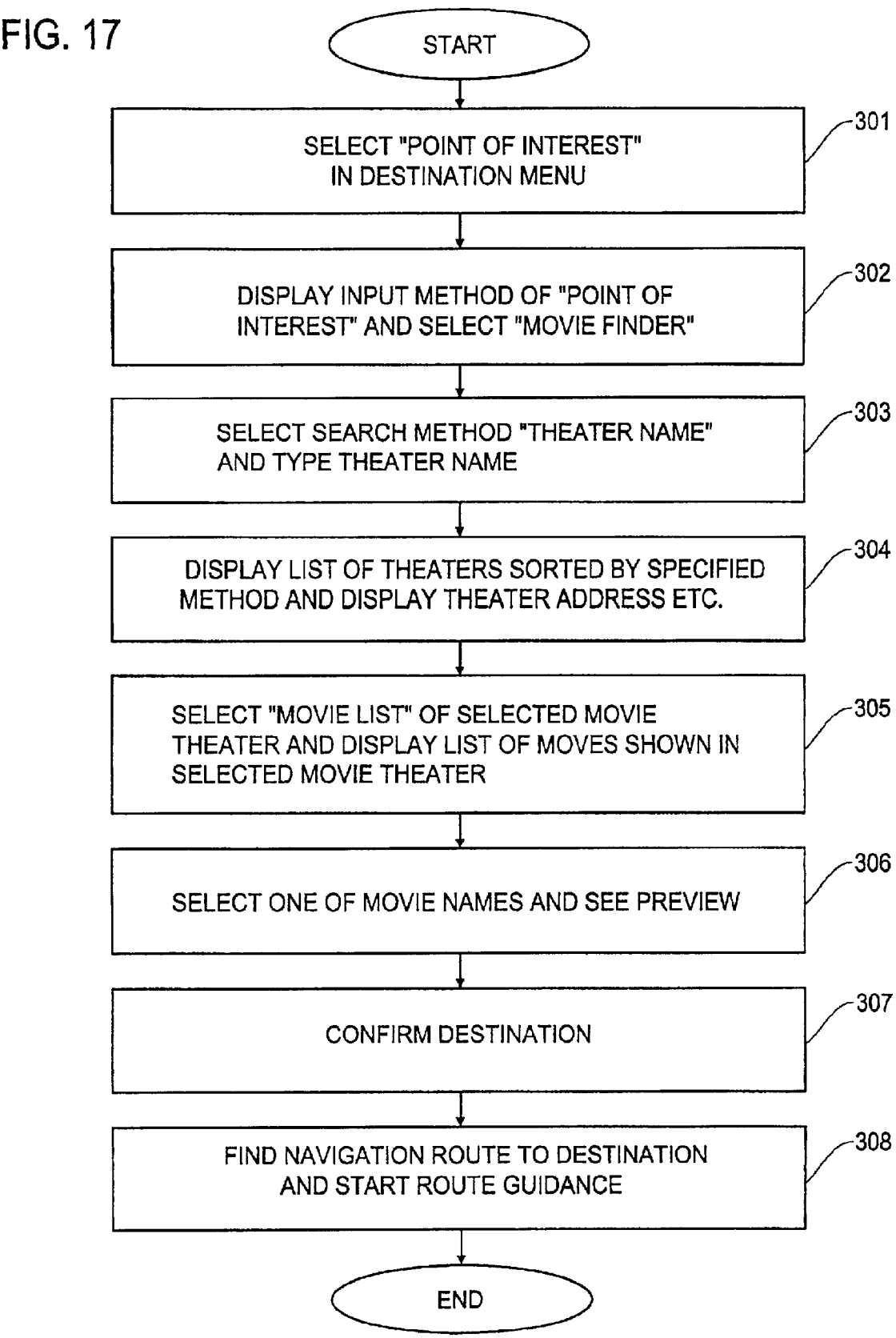

EVENT FINDER WITH NAVIGATION SYSTEM AND DISPLAY METHOD THEREOF

FIELD OF THE INVENTION

This invention relates to an event finder with a navigation system or implemented in a remote terminal, and more particularly, to an event finder for searching events such as movies, sports, weather, news and the like through a remote terminal such as a lap top computer, personal digital assistant (PDA) and vehicle navigation system having a positioning capability.

BACKGROUND OF THE INVENTION

Modern vehicles are equipped with sophisticated electronic devices such as multimedia entertainment systems, GPS navigation systems, internet access devices, and the like. This invention is directed to an event finder typically implemented in such vehicle electronic devices, although the present invention is not limited to the automobile use. The present invention can also be applied to lap top computers, personal digital assistant (PDA) devices, hand held GPS (global positioning system) devices, portable vehicle navigation systems and the like. However, for the illustration purpose, the present invention will be described mainly with respect to the vehicle navigation system.

When driving an automobile or travelling in town, a user may want to know whether there are favorite events nearby, for example, a movie. If there is a movie she wants, she further wants to know the location of the movie theater, start time and other information. If she has a cellular phone and knows the phone number, she may call the phone number and request the information. If she has a portable computer device with a wireless communication, such as a PDA with internet access capability, she may be able to obtain such event information.

However, for such information can be really useful, she needs to know her current location, how to get to the movie theater, what time she can arrive, how long she has to wait before the next movie start, and etc. In other words, without positioning capability such as GPS navigation system, such event information may not be very useful.

Thus, there is a need of a new and efficient way to obtain event information in combination with a navigation capability such as a vehicle navigation system. More particularly, a method and apparatus is needed for easily and cost effectively obtaining accurate information on events and guiding the user to easily and efficiently reach the places where such events take place.

SUMMARY OF THE INVENTION

It is, therefore, an object of the present invention to provide an event finder which is capable of easily obtaining information on events associated with current locations of the user with high efficiency and flexibility.

It is another object of the present invention to provide a method and apparatus for finding event information, displaying such information, and guiding a user to reach the place where such an event takes place.

It is a further object of the present invention to provide an event finder and its display method which facilitates communication between a vehicle navigation system and an information server through wireless communication means.

The present invention is an event finder on a remote terminal for finding events such as movies, sports, weather, news and the like through a remote terminal such as a lap top computer, personal digital assistant (PDA) and vehicle navigation system with positioning capability. The event finder includes a display, a data terminal connected to the display for processing data, a navigation system for determining position of a user and a destination, and a transceiver for receiving event data from an event data server through a communication system. The data terminal associates the event data from the event data server with position information from the navigation system and retrieves event information based on a selection method specified by the user.

According to the present invention, the event finder is capable of easily obtaining information on the events and event locations associated with current position of the user with high efficiency and flexibility. The event finder allows the user to find event information, displays such information, and guides the to reach the event location where the selected event takes place. The event finder facilitates communication between the navigation system and the data server through the wireless communication.

BRIEF DESCRIPTION OF THE DRAWINGS

FIG. 7 is a data table showing an example of movie database entry provided by a movie theater company which can be stored in the event database server or content aggregator of FIG. 6.

FIGS. 8A–8D are schematic diagrams showing display examples on the event finder (navigation system) for searching and specifying a movie in a step-by-step basis in accordance with the present invention.

FIG. 9 is a schematic diagram showing a display example on the event finder (navigation system) of the present invention illustrating the movie information on the particular movie specified by the user through the process of FIGS. 8A-8D.

FIG. 10A is a schematic diagram showing a display example of the event finder (navigation system) of the present invention illustrating the list of movie theaters showing the movie specified by the user, and FIG. 10B is a display example showing optional information associated with the movie theater specified in FIG. 10A.

FIG. 13 a schematic diagram showing a display example of the event finder (navigation system) of the present invention for specifying the movie theater in the process of FIG. 8C.

FIG. 14 is a schematic diagram showing a display example of the event finder (navigation system) of the present invention illustrating the theater list sorted by distance after the process of FIG. 13.

FIG. 15 is a schematic diagram showing a display example of the event finder (navigation system) of the present invention illustrating the list of movies played in the movie theater specified in the process of FIG. 14.

FIG. 17 is a flow chart showing an example of operational process in the event finder for finding the movie theater and the movie in the embodiment of FIG. 8 and FIGS. 13–16.

DETAILED DESCRIPTION OF THE INVENTION

The event finder of the present invention will be described in more detail with reference to the accompanying drawings. While the present invention will be described in conjunction with the vehicle navigation system, it will be understood that the present invention is not limited to such a specific application. For example, the present invention can also be applicable to a portable data terminal such as a personal digital assistance (PDA) and a lap top computer with a navigation function. Further, the event finder of the present invention will be described mainly with respect to an application for finding a movie, i.e, movie finder, the basic concept is applicable to other types of event as well.

Figure 1A:
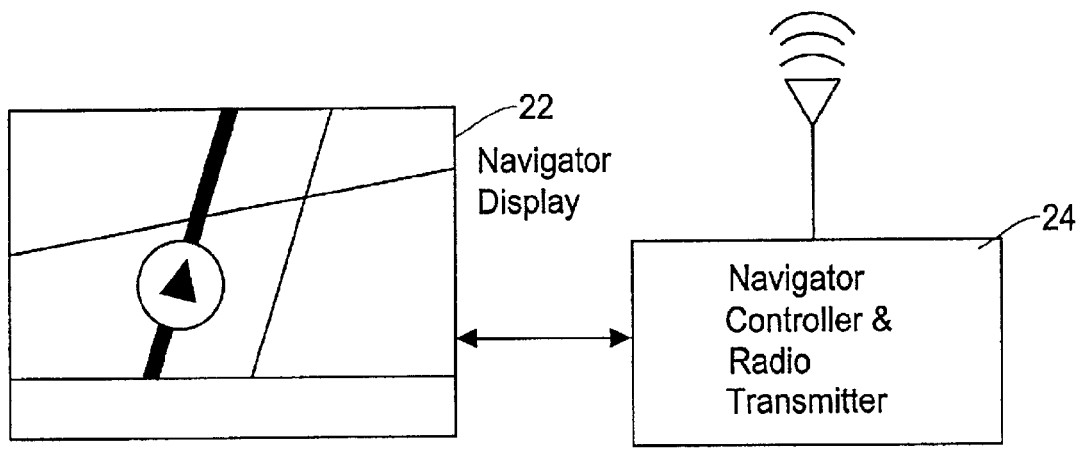
FIGS. 1A and 1B are schematic diagrams showing examples of basic configuration of an event finder installed in a vehicle or portable terminal having GPS navigation capability in accordance with the present invention.
Figure 1B:
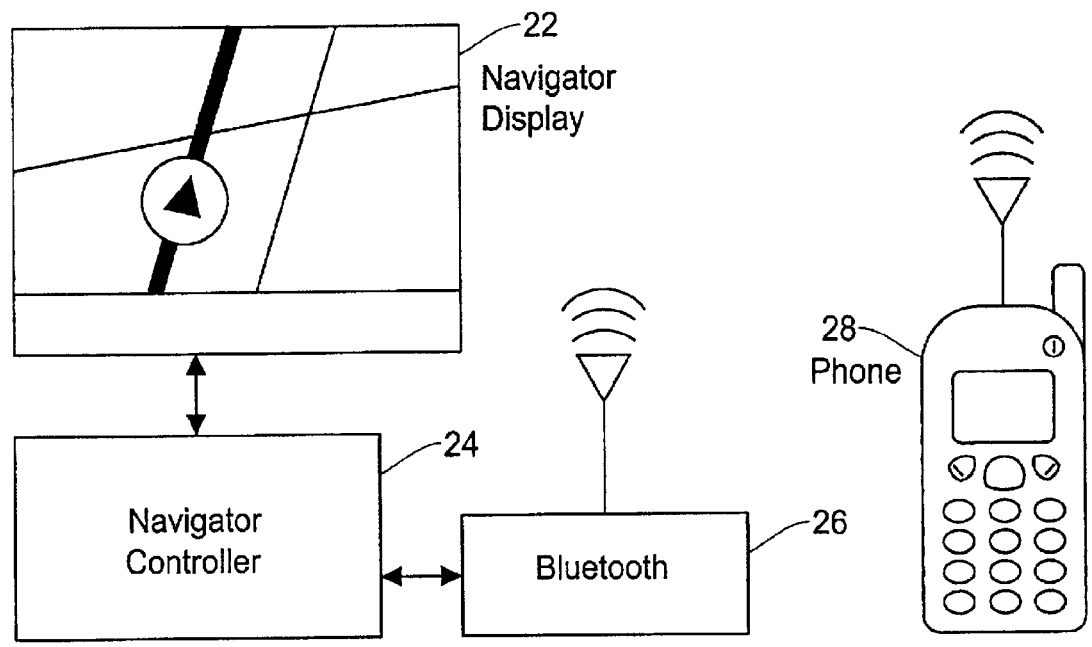

FIGS. 1A and 1B schematically show a basic structure of the event finder of the present invention. The event finder is a combination of a wireless transmission device and a navigator (hereafter also referred to as "navigation system") with event finder software. Typically, the navigator is a vehicle navigation system which is installed in a vehicle. In such an application, the event finder of the present invention is established by incorporating an event finder function and a radio communication device in the navigation system. An example of radio communication device includes a satellite radio transmitter, FM subcarrier transmitter, cellular phone, a Bluetooth transceiver or other radio communication method as an embedded or peripheral device.

FIG. 1A shows an event finder formed of a navigator and a radio transmitter. In the example of FIG. 1A, the event finder includes a navigator display 22 and a navigator controller 24 and a radio transmitter 24. There are various databases and transmission methods available at preset or in the near future. An example of such database includes information on movie, sports, news, weather and the like. An example of navigator includes a hand held GPS navigator, a portable vehicle navigator, a vehicle navigation system fixed to a vehicle, and the like.

FIG. 1B shows an event finder formed of a navigation system, a short distance radio transmitter such as a Bluetooth transceiver and a Bluetooth compatible cellular phone. The navigation system is comprised of a navigator display 22 and a navigator controller 24 with an event finder software. An example of short distance transmitter 26 includes a Bluetooth transmitter (transceiver), an IEEE 802.11b wireless LAN transmitter and a HomeRF transmitter. The short distance wireless transmitter 26 is connected to the navigation system and communicates with the cellular phone 28 to establish long distance radio communication. The cellular phone 28 is compatible with the Bluetooth or other radio communication protocol noted above.

As is well known in the art, in the example of vehicle navigation system, the navigator display 22 shows a locator map display or a route guidance display. The locator map display shows a map image and a current vehicle position and the route guidance display shows an intersection and a direction to turn for guiding the user to the destination. Various other display example may be possible depending on whether such a navigation system is a vehicle mount type, a hand held GPS, a data terminal such as PDA, or the like.

Figure 2:
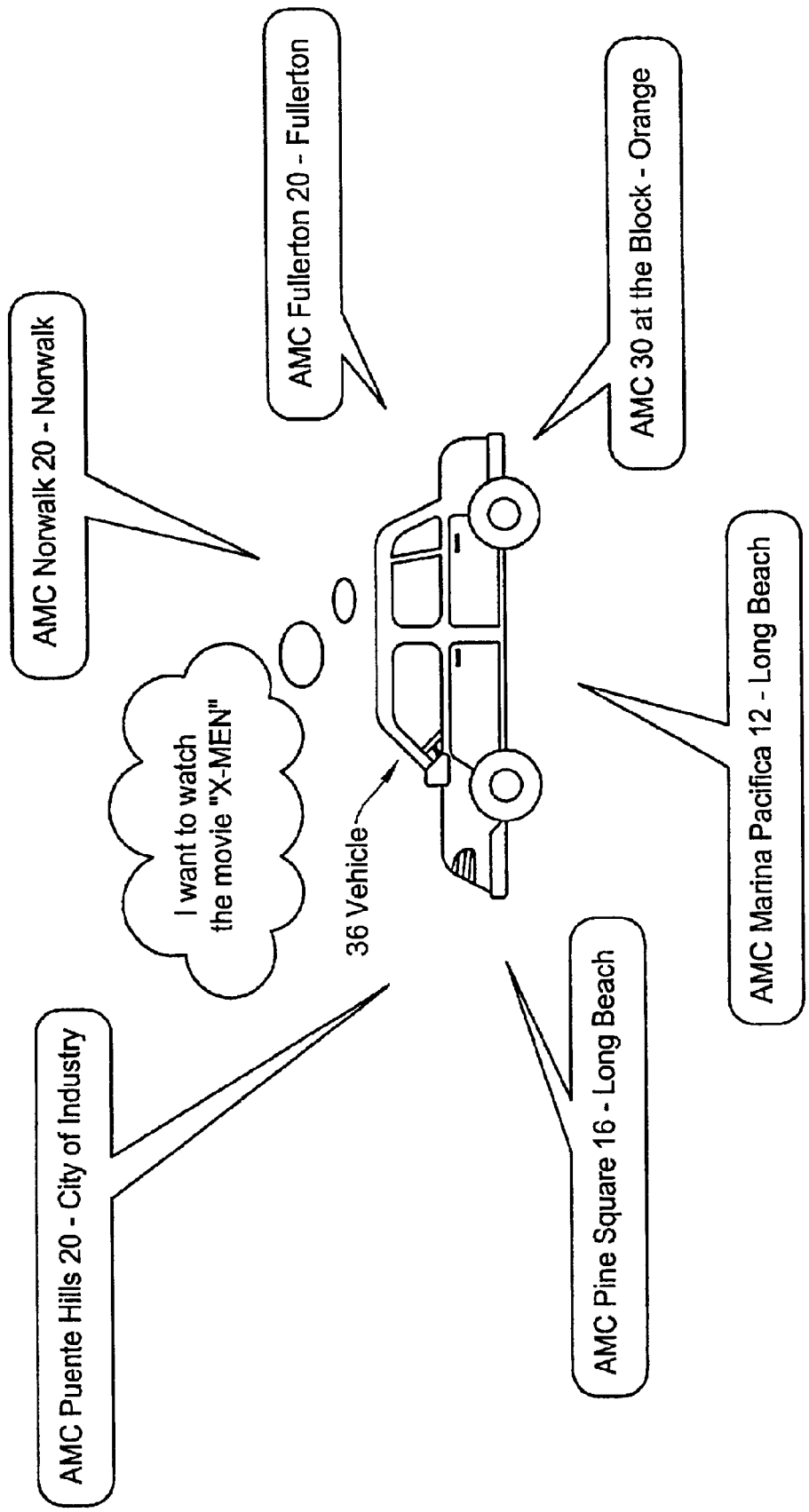
FIG. 2 is a schematic diagram showing an example of situation where the invent finder of the present invention is advantageously applied in which a user wants to find a movie while driving a car.

As shown in FIG. 2, the event finder of the present invention is advantageously used in a vehicle 36 having a navigation system. As is known in the art, the navigation system is capable of determining the current vehicle position with use of signals from GPS (Global Positioning System) satellites. Thus, when the user in the vehicle wants to find a certain event, such as a movie, the event finder of the present invention can search not only the movie (event) and the movie theaters (event location), but also locations of the movie theaters, estimated arrival times, movie (event) start times, effective routes to the selected movie theater (event location), and etc., with respect to the current location of the vehicle 36.

In this particular example, the user wants to watch a specific movie "X-Men" which is played various movie theaters. The event finder of the present invention will display theater information in balloon like illustrations as shown in FIG. 2 on a road map (not shown) or a list of movie theaters sorted by the distance from the current vehicle position or display a list of movie theaters sorted by the start time, or the like. The event finder may also show the arrival time and wait time with respect to the specified movie theater. When the user selects a movie theater that she wants to go, the event finder (navigation system) calculates the most effective route to the selected movie theater and guides the user to arrive the theater.

Figure 3:
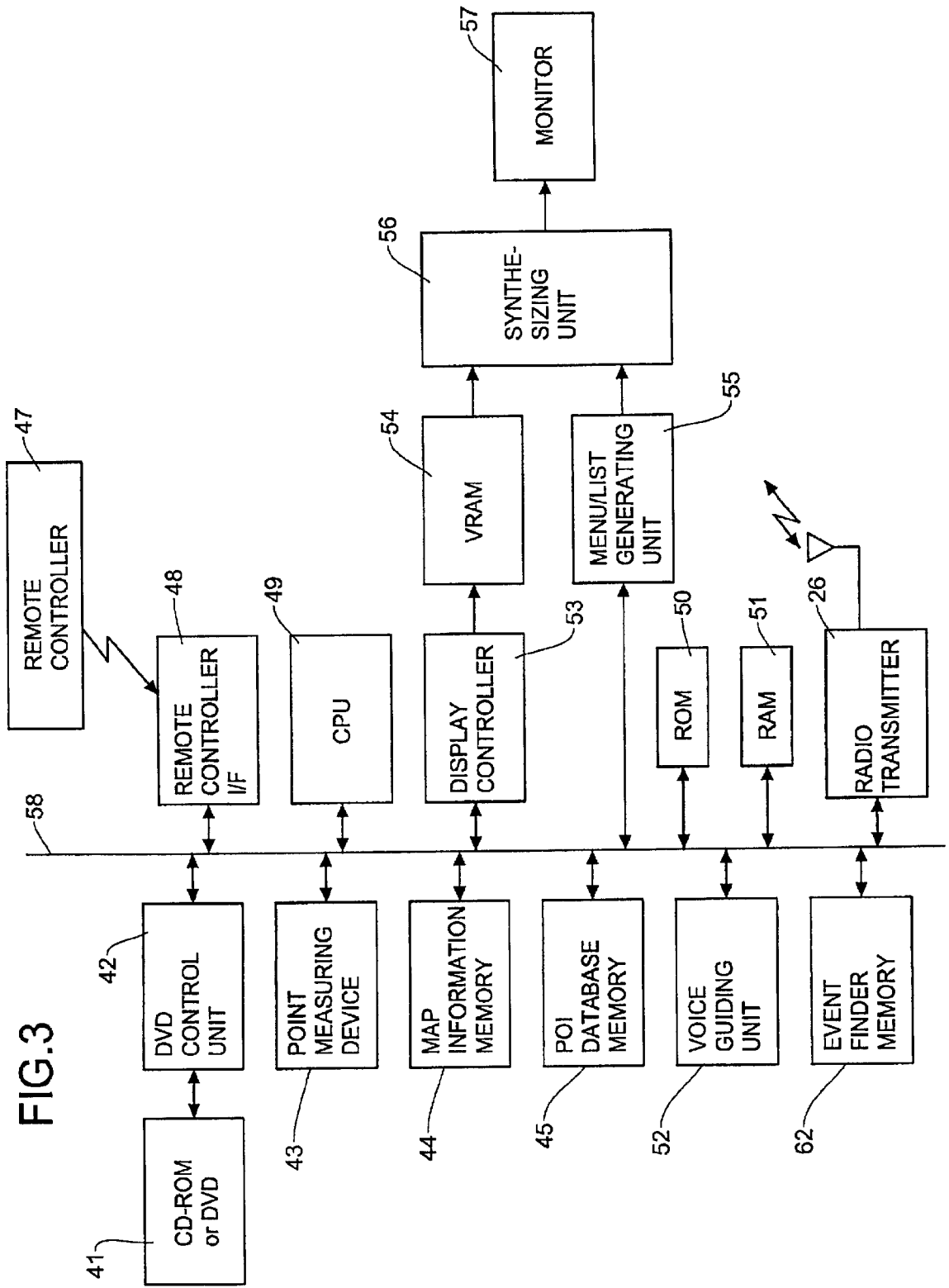
FIG. 3 is a functional block diagram showing a structure of a vehicle navigation system which additionally includes an event finder function and a radio transmission function.

FIG. 3 shows an example of structure in the navigation system including the event finder function of the present invention. In the block diagram of FIG. 3, the navigation system includes a map storage medium 41 such as a CD-ROM or DVD (hereafter "DVD") for storing map information, a DVD control unit 42 for controlling an operation for reading the map information from the DVD, a point measuring device 43 for measuring the present vehicle position which has a vehicle speed sensor for detecting a moving distance, a gyro for detecting a moving direction, a microprocessor for calculating a position, a GPS receiver, and etc.

The navigation system includes a map information memory 44 for storing the map information which is read out from the DVD 41, a database memory 45 for storing database information such as point of interest (POI) information which is read out from the DVD 41. The navigation system includes a remote controller 47 for executing a menu selection operation, an enlarge/reduce operation, a destination input operation, etc. and a remote controller interface 48.

The navigation system further includes a processor (CPU) 49 for controlling an overall operation of the navigation system, a ROM 50 for storing various control programs such as a route search program, a map matching program necessary for navigation control and an event finder program for controlling an overall operation of the event finder, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/ various list images, a synthesizing unit 56 for synthesizing images from the VRAM 54 and the menu/list generating unit 55, a monitor (display) 57, and a bus 58 for interfacing the above units in the system.

The navigation system further includes an event finder memory 62 for storing the event information, a radio transmitter 26 which is typically a long-range wireless transceiver such as a satellite transceiver, FM subcarrier transmitter or a short-range wireless transmitter such as a Bluetooth transceiver, or other wireless transmitter. The radio transmitter 26 receives event data from various service providers through wireless transmission. The radio transmitter 26 may further receive various vehicle parameters including mileage, gas levels, oil levels, an air bag sensor or a shock sensor to monitor the current conditions of the vehicle, which is not directly related to the event finder of the present invention.

Figure 4:
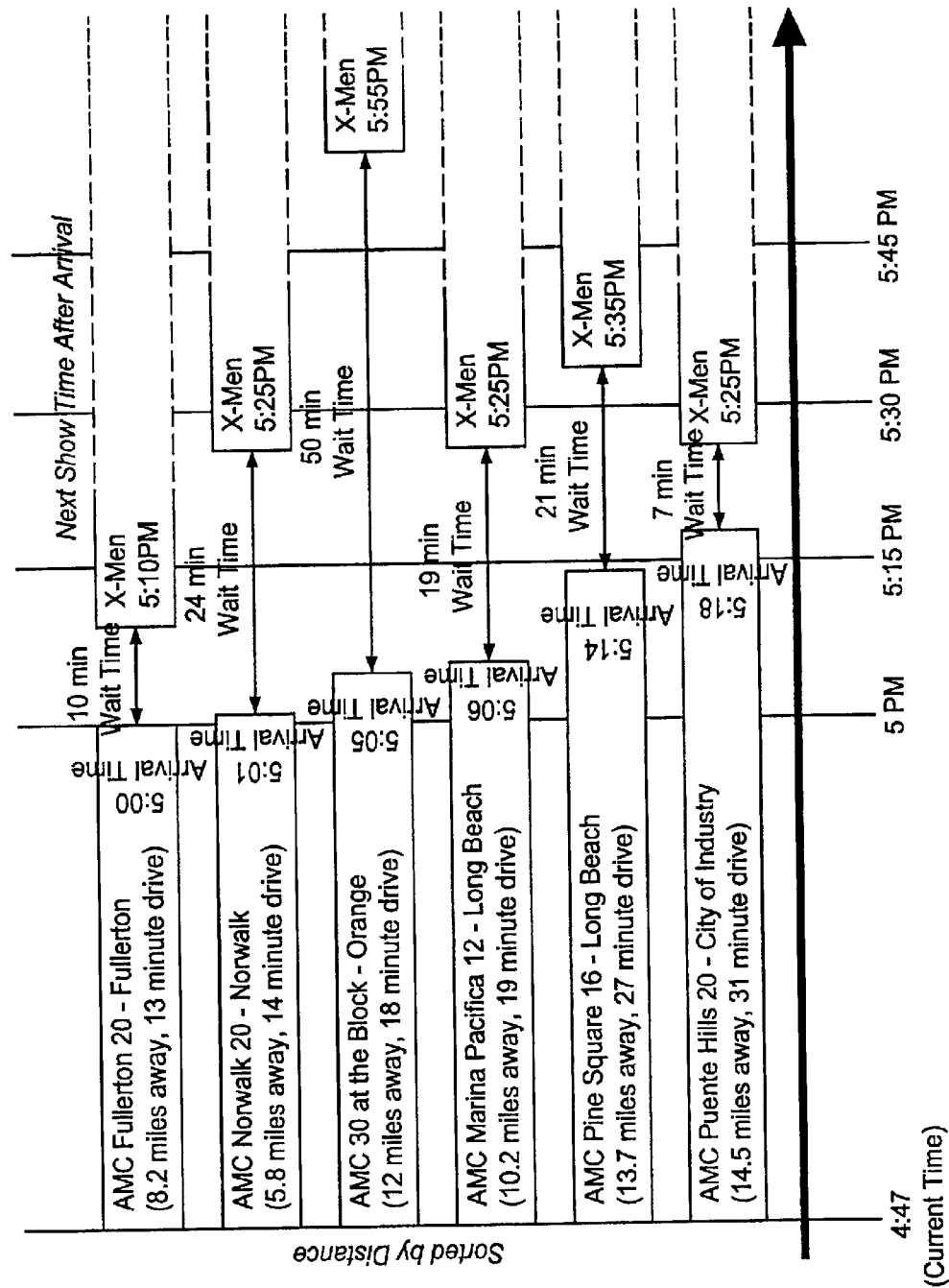
FIG. 4 is a diagram showing an example of information obtained in the event finder and display method of the present invention where a particular movie event is sorted by distance between the current location of a user and movie theaters showing the movie.

FIG. 4 shows an example of data sorting in the event finder when the user specifies the movie title "X-Men" in the event finder. In the example of FIG. 4, the movie theaters are sorted by distance from the current vehicle position, i.e., the arrival time to the theater. The data of each movie theater also includes the show time indicating the start time of the next show after arrival. The time difference between the arrival time and the show time is a wait time. Thus, the event finder of the present invention is able to display the event data in the order of arrival time (distance), show time or combination thereof.

Since the example of data in FIG. 4 is sorted by the distance (arrival time) from the current vehicle position, the movie theater "AMC Fullerton 20" is displayed as a top list. The data on the selected movie theater or the movie theater on the top list will be displayed on the navigation system in a manner shown in FIG. 10A. In this example of FIG. 4, the data shows that the show time (start time) in the theater "AMC Fullerton 20" is the earliest. If the user thinks that the wait time in this case is too short, she may choose the second movie theater "AMC Norwalk 20". Therefore, the event finder of the present invention allows the user to flexibly select the event based on various aspects.

Figure 5:
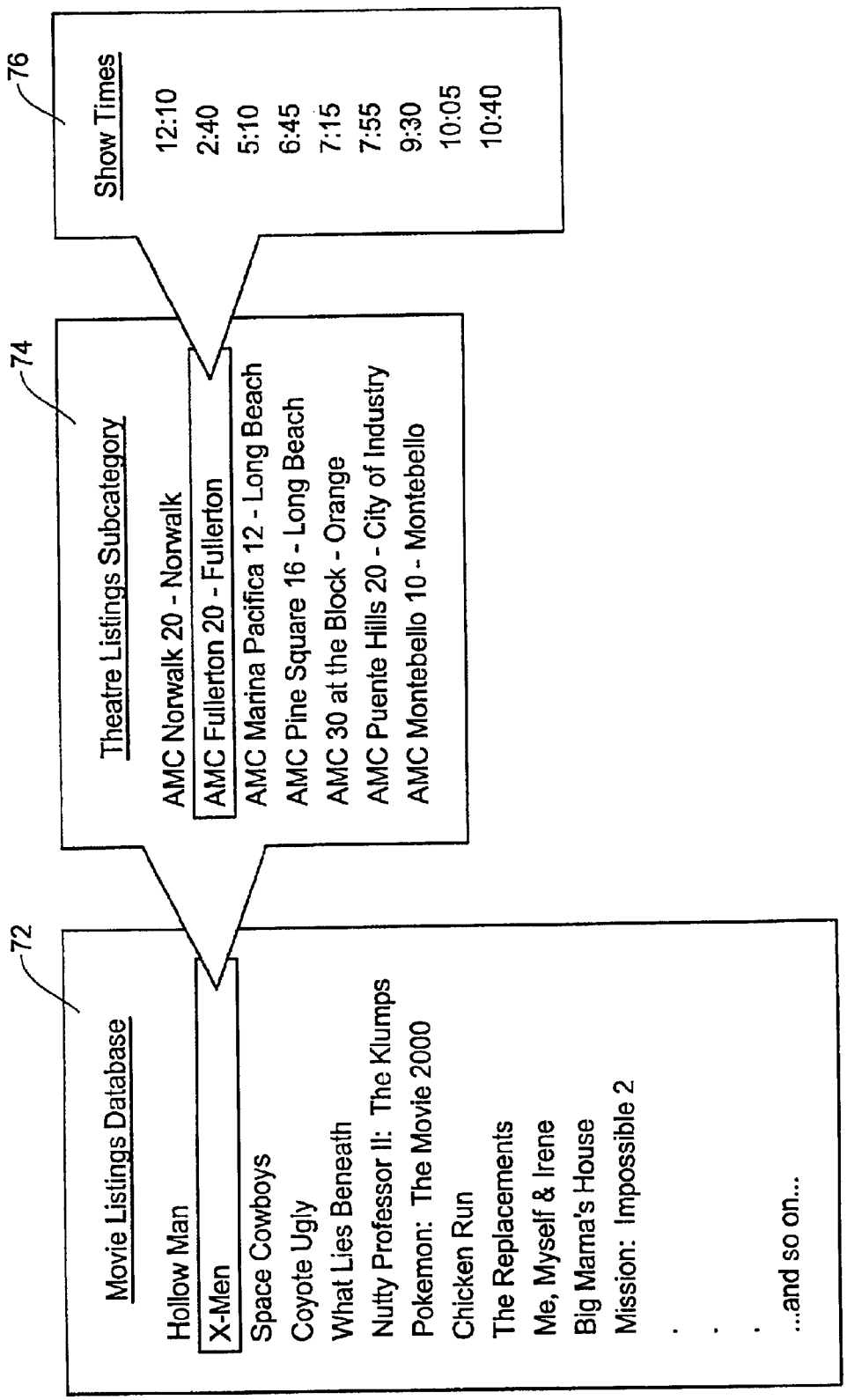
FIG. 5 is a schematic diagram showing display examples associated with the invent finder listing the event information in a pull-down and hierarchial structure in accordance with the present invention.

The event data such as the movie database delivered via the radio transmission contains listings of events (movie names), event locations (movie theaters) and time to those events (show time). The listing of event data may be in a hierarchy format such as shown in FIG. 5. For example, a database 72 includes a list of movie names. When a movie title such as "X-Men" is selected, theater listing 74 establishes a list of movie theaters showing the movie "X-Men". The order of listing can be specified by the user through the event finder such as distance, show time, price, and the like. When a movie theater such as "AMC Fullerton 20" is selected, show time listing 76 establishes a list of start times of the movie title "X-Men" in the movie theater "AMC Fullerton 20".

Figure 6:
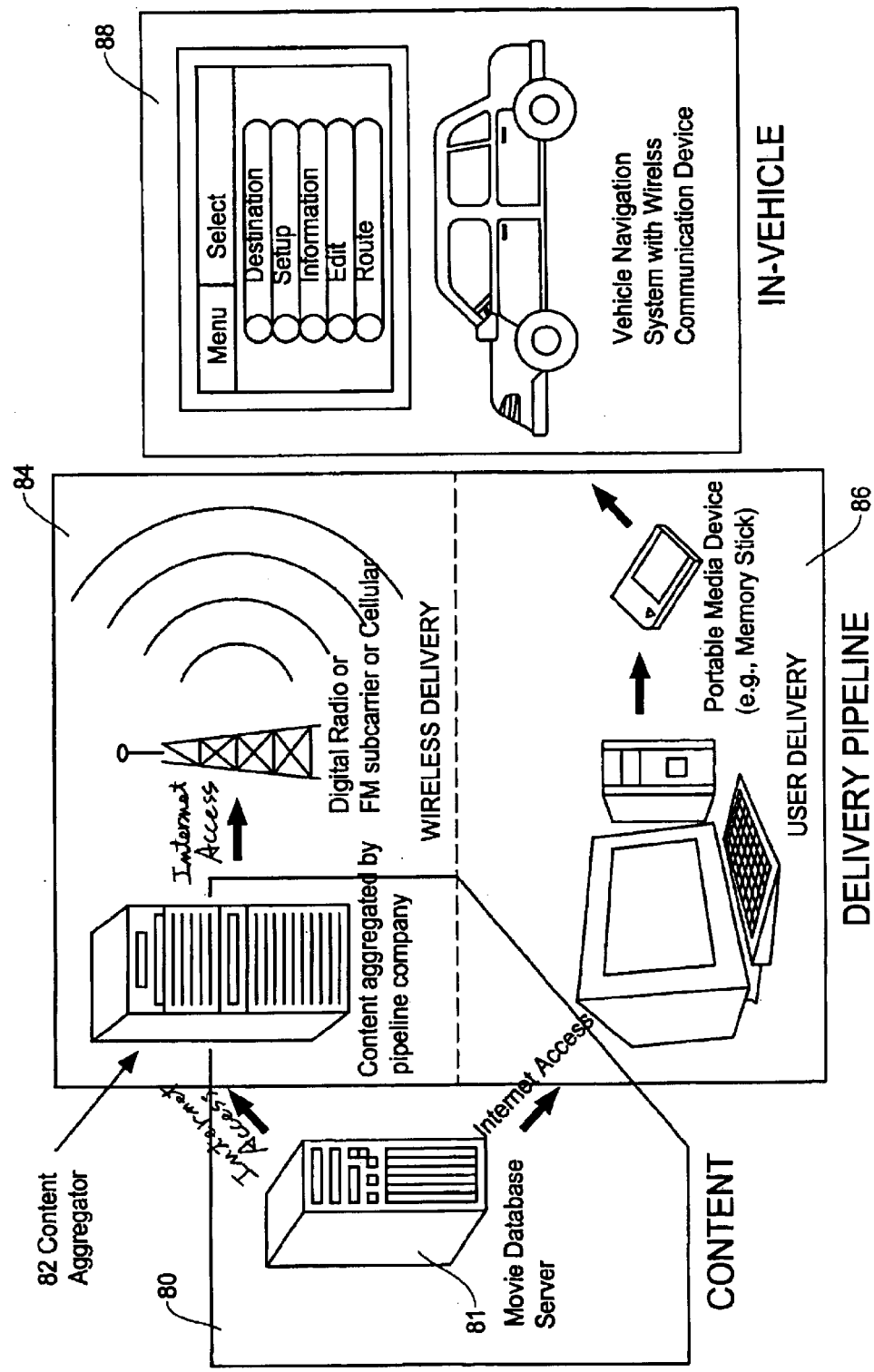
FIG. 6 is a flow chart showing an image of overall system involving the event finder of the present invention including event database servers, event information delivery infrastructures, and vehicle navigation system.

An overall system associated with the event finder of the present invention is shown in FIG. 6. In this example, the overall system includes an event finder 88 installed in a vehicle in combination with a vehicle navigation system. The overall system further includes an event data server 80 such as a movie database 81 and a content aggregator 82, and event data delivery infrastructures (delivery pipeline) in a form such as wireless delivery 84 and user delivery 86. Typically, the event data server 80 provides services through which an event database is accessible by subscribed members of unlimited number through a public telecommunication system such as Internet.

Typically, the movie database 80 is managed and hosted by a movie theater company. Database for other types of event information may also be available through corresponding companies and organizations. An example of such database includes sports games, dramas, TV programs, races, traffic information, news, and weather forecast. Typically, such event databases are aggregated to the content server or content aggregator 82.

An example of the wireless delivery 84 is a radio data transmission network to establish wireless communication with the user. The wireless delivery 84 accesses the event data server 81 or content aggregator 82 through Internet (public communication system) and sends the event data to the user through the radio transmission. Various radio transmission methods are used in the wireless delivery 84, for example, radio satellite transmission, FM subcarrier transmission, AM radio transmission (digital radio) and the like. The FM subcarrier transmission and AM radio transmission may also be used to access the Internet applications for automobile and hand held device. The event finder 88 receives the event data through the radio transmitter 26 and processes the event data in combination with the position data produced by the navigation system.

An example of user delivery 86 is Internet through telephone networks (public communication system). Typically, a user subscribes to receive services from the service provider and downloads the event data through the Internet to her personal computer. The event data may be archived to a portable storage such as a memory stick, flash card, DVD and the like. The user inserts the portable storage in the navigation system so that the event data and the position data interrelate with one another. The resultant information will be displayed through the event finder of the present invention.

FIG. 7 is a table showing an example of event data entry in the movie database. Such a movie database is provided by contractual basis with a content provider such as a movie theater company. The data entry includes information on movie title, start time, run time, theater information, ticket pricing, movie summary, poster image and etc. The event finder arranges the event data in response to the inquiry made by the user as well as the position information by the navigation system. The display examples by the event finder of the present invention are shown in FIGS. 9 and 10.

FIGS. 8A–8D show an example of process for finding an event through the event finder of the present invention. In this case, the event finder is a movie finder incorporated in the vehicle navigation system. FIG. 8A is a screen for specifying a destination which typically appears when selecting "Destination" menu in a main menu screen (not shown) of the vehicle navigation system. This screen 91 shows various methods for finding and specifying the destination in the navigation system for guiding the user thereto. Such methods are common in the industry, thus no explanation on each method is given here.

With respect to the movie finder, when selecting, for example, a "Point of Interest" menu in FIG. 8A, the navigation system displays a "Find Point of Interest By" screen 92 such as shown in FIG. 8B. In this screen 92, the user specifies a destination through a search menu "Place Name" or "Place Type". In this example of FIG. 8B, the "Point of Interest" search menu includes a "Movie Finder" menu, i.e., the event finder of the present invention.

When selecting the "Movie Finder" in FIG. 8B, the navigation system displays a movie finder menu such as shown in FIG. 8C. This "Find a Movie By" screen 93 lists various search methods for finding movie information including "Movie Name", "Movie Theater" and "Top Ranked Movies". Other possible search methods will be "Star Name", "Movie Category" such as action, romance, comedy, foreign, etc., "Award Winning", "Adult Only" and the like.

When selecting the "Movie Name" menu, the movie finder displays a keyboard screen 94 for typing the intended movie name as shown in FIG. 8D. The same keyboard screen 94 will be displayed when selecting the "Movie Theater" menu in FIG. 8C. The user types the movie name, for example, "X-Men" on the screen 94. For example, the navigation system (event finder) uses an incremental matching method so that movie names matching the characters incrementally input to the keyboard screen may be displayed as a list, which is shown in the lower part of the keyboard screen 94. Thus, in many cases, it is not necessary to completely input the full name of the movie but several characters may be sufficient to display the desired movie names on the screen.

By selecting the movie name "X-Men" in FIG. 8D, the movie finder is changed to a movie preview screen 96 of FIG. 9 showing the information on the selected movie "X-Men". In this display example, the preview screen 96 shows the movie title 100, movie run time 102, movie notes 104 including names of actors and actresses, movie rating 105 such as PG, PG-13 or R, and a poster image 106 if the bandwidth of information through the delivery method in FIG. 6 is sufficient to cover such an image.

The lower part of the screen shows a list of associated menus including a "List Theater" menu 107, a "Read Synopsis/Reviews" menu 108, and a "View Movie Trailer" menu 109. The "List Theater" menu 107 is to search movie theaters showing the selected movie "X-Men" within a predetermined distance from the current vehicle location. The "Read Synopsis/Reviews" menu 108 is to show the summary of the movie in an audio or text form or a combination of both audio and text. Since the navigation system usually equipped with a speech engine, the audio synopsis will be convenient when the user is driving the vehicle. When the vehicle is parked or anyway standstill, the user can read the synopsis in the text format.

The "View Movie Trailer" menu 109 is to playback the movie trailer of the selected movie. This menu will be available if the communication bandwidth in the delivery method in FIG. 6 is sufficient. Thus, if the user selects the menu 109, the movie finder shows the preview of the movie "X-Men" on the display screen. An example of image display function currently available is Windows Media Player and Real Player decoder.

When the user finds that she likes the movie selected, she wants to find a movie theater showing the movie. Thus, in FIG. 9, if the user determines that the movie "X-men" is the movie that she wants to watch, the next step is to find a convenient movie theater based on her current vehicle position and the time. Thus, the movie finder screen 96 may highlight the "List Theater" menu 107 in default.

Figure 11:
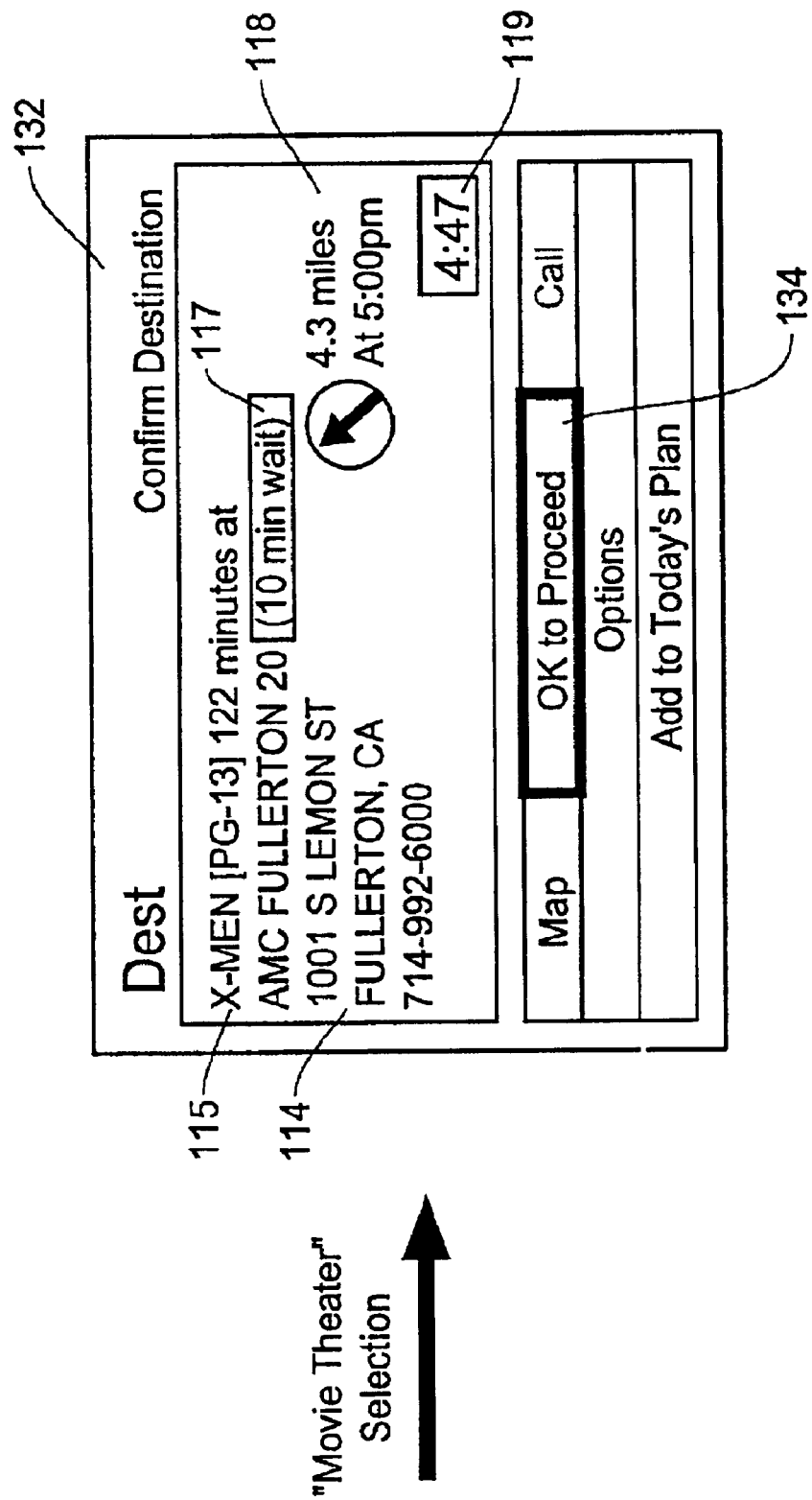
FIG. 11 a schematic diagram showing a display example of the event finder (navigation system) of the present invention for confirming the final destination after the process of FIGS. 9 and 10.

When selecting the "List Theater" menu 107, the event finder displays a theater list screen 112 as shown in FIG. 10A. The theater list screen 112 lists the movie theaters showing the movie "X-Men". Such movie theaters are sorted, for example, by distance from the current vehicle position. In this example, the nearest movie theater "AMC Fullerton 20" is on the top list 122 and its address and telephone number are displayed in theater information 114 on the theater list screen 112. When the user selects a movie theater, the navigation system moves to a destination confirmation process such as shown in FIG. 11.

The theater list screen 112 of FIG. 10A shows a show time list 116, movie title rating and duration 115, distance and arrival time 118 and a current time 119. In the show time list 116, the movie finished or in progress may be displayed by gray color while the movie upcoming may be displayed by black color. Further, the show time of the next movie and the wait time after arrival will be shown as highlighted information 117. The navigation system calculates the arrival time 118 and displays the wait time which is a difference between the arrival time and the next show time.

In the example of FIG. 10A, the theater list screen 112 includes "Options" menu for each movie theater. When the "Options" menu is selected, the movie finder displays a theater option screen 126 such as shown in FIG. 10B. In this example, the theater option screen 126 includes a "Ticket Pricing" menu 127, a "Theater Attendance" menu 128 and a "Purchase Advance Ticket" menu 129. A "Call" menu 130 is included in the screen 126 for verbal communication with the theater through a wireless telephone.

When selected, the "Ticket Pricing" menu 127 is to display a ticket price or a price list in the selected movie theater such as "AMC Fullerton 20". The "Theater Attendance" menu 128 is to show the surrounding conditions such as parking availability of the selected movie theater. If two-way communication is available, when selecting the "Purchase Advance Ticket" menu 129, the movie finder can display ticket availability and ticket purchase options. Thus, the user may purchase the ticket for movie "X-Men" through the movie finder before arriving the movie theater.

In the theater list screen 112, if one of the theaters is selected, the navigation system displays a confirmation destination screen 132 such as shown in FIG. 11. The information displayed on this screen regarding the movie theater is basically the same as that shown in FIG. 10A. The confirmation destination screen 132 includes an "OK to Proceed" menu 134. If the user selects the "OK to Proceed" menu 134, the navigation system calculates the route to the movie theater "AMC Fullerton 20" and changes the display to a route guidance screen (not shown) for guiding the user to arrive the selected movie theater.

Figure 12:
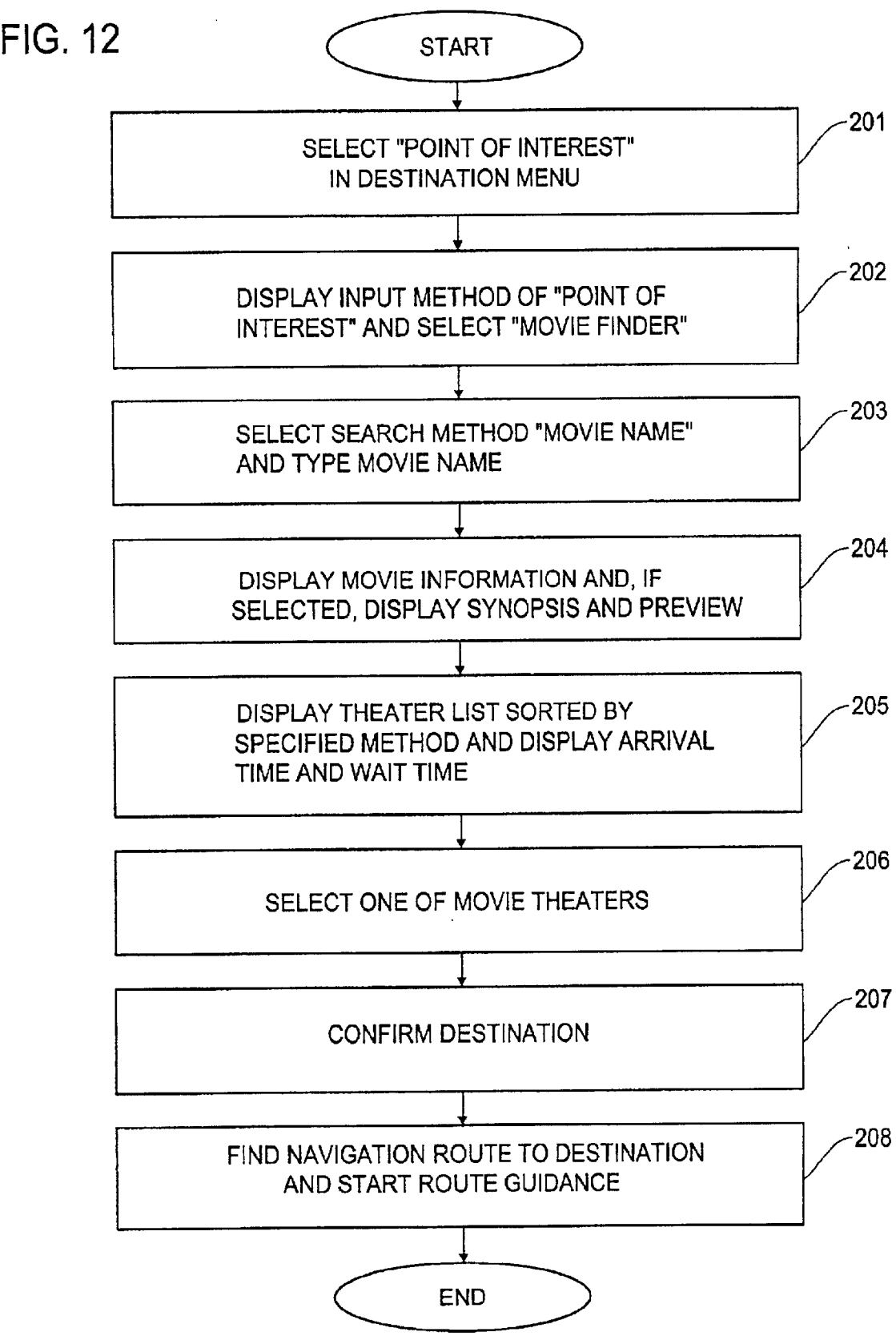
FIG. 12 is a flow chart showing an example of operational process in the event finder for finding the movie and movie theater in the embodiment of FIGS. 8-11.

FIG. 12 is a flow chart summarizing the operational process in the event finder of the present invention for finding the movie and movie theater in the embodiment of FIGS. 8–11. The operation starts after selecting "Destination" in the main menu (not shown). Thus, in the destination selection menu such as shown in FIG. 8A, the user selects "Point of Interest" at step 201.

Then, at step 202, the event finder (navigation system) displays the "Find Point of Interest By" screen 92 shown in FIG. 8B which lists input methods for finding a point of interest. The list includes an event finder menu, in this example, the "Movie Finder" menu. The user selects the "Movie Finder" so that, at step 203, the event finder displays the "Find a Movie By" screen 93 of FIG. 8C listing search methods for finding a move. The list includes "Movie Name", "Movie Theater" and "Top Ranked Movies".

The user selects the "Movie Name" to specify the movie name, which leads the event finder to show a keyboard screen 94 of FIG. 8D. When the user inputs the movie name such as "X-Men", at step 204, the event finder displays the move preview screen 96 showing the information on the movie "X-Men". As shown in FIG. 9, the move preview screen 96 also shows a list of menus including "List Theater", "Read Synopsis/Reviews" and "View Movie Trailer" menus. Thus, by selecting such menus, the user can read the synopsis of the movie "X-Men" or see the preview of the movie "X-Men".

If the user selects the "List Theaters" menu, the event finder displays a theater list screen 112 which lists the movie theaters playing the specified movie title "X-Men" in step 205. As shown in FIG. 10A, the movie theaters are sorted by, for example, distance from the user's current position. Other than the name, address and phone number of the movie theater, the theater list screen 112 includes an arrival time of the user, a start time and wait time for the move, based upon the distance and route to the specified movie theater calculated by the navigation system.

In step 206, the user selects one of the movie theaters, which results in the "Confirm Destination" screen 132 of FIG. 11. If the information in the confirmation screen 132 matches the destination that the user wants to go, she selects "OK to Proceed" at step 207. Then, at step 208, the navigation system calculates appropriate routes to guide the user to the selected destination, i.e, the movie theater, and changes the display to a route guidance screen.

FIGS. 13–16 shows display examples in the movie finder of the present invention in which a movie theater is selected first rather than a movie name. In the movie finder screen 93 in FIG. 8C, if the user selects the "Movie Theater" menu, the movie finder displays a "Find Movie Theater By" screen 142 such as shown in FIG. 13. The screen 142 includes search menus for finding a movie theater which are "Sorted by Distance", "by Name" and "Within a City" methods. If the "by Name" menu is selected, the movie finder displays the keyboard screen 94 shown in FIG. 8D for inputting the name of the movie theater. Similarly, if the "Within a City" method is selected, the movie finder displays the keyboard screen 94 of FIG. 8D for inputting the name of the city.

When the "Sorted by Distance" menu is selected, the movie finder displays a "Select Movie Theater" screen 146 such as shown in FIG. 14. The select movie theater screen 146 shows a movie theater list 149 in the order of distance from the current vehicle location. The closest movie theater "AMC Fullerton 20" is highlighted and its information 148 is shown in the screen. Such information includes the name, address and phone number of the movie theater. The distance to the movie theater is also shown in the information 148.

If the user selects the highlighted movie theater in the list, the navigation system moves to the destination confirmation screen 132 of FIG. 11 to calculate the route to the destination. Each theater name in the movie theater list 149 has a "Movie List" menu. If the user selects the movie list menu for the selected movie theater, the movie finder displays a "Select Movie Name" screen 152 shown in FIG. 15. The select movie name screen 152 shows a movie name list 154 played in the specified movie theater, for example, "AMC Fullerton 20".

If the user selects one of the movie names in the movie name list 154 such as "X-Men", the movie finder displays the movie preview screen 96 shown in FIG. 9. Thus, the user can see further information on the movie as well as the movie trailer and synopsis. In the example of FIG. 15, the select movie name screen 152 shows the movie theater information 148 which was also shown in the select movie theater screen 146 of FIG. 14.

Figure 16:
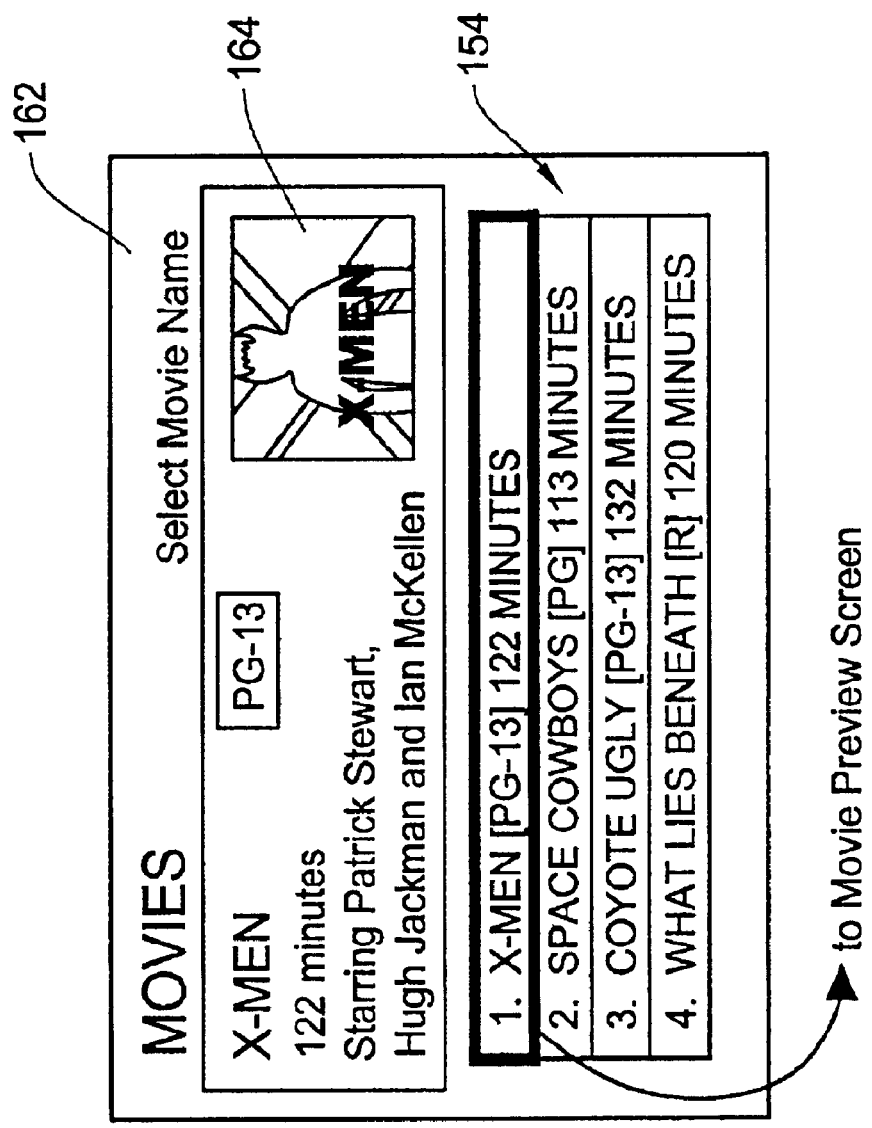
FIG. 16 is a schematic diagram showing a display example of the event finder (navigation system) of the present invention illustrating the information regarding the movie specified in the process of FIG. 15.

Alternatively, the movie finder displays a "Select Movie Name" screen 162 such as shown in FIG. 16. The select movie name screen 162 shows movie information 164 for the movie highlighted in the movie name list 154. In this example, the movie information 164 includes the movie name, movie run time, movie rating, star names, poster image, and the like. If the user selects one of the movie names in the movie name list 154 such as "X-Men", the movie finder displays the movie preview screen 96 shown in FIG. 9. Thus, the user is able to see the preview or read the summary of the movie through the "Read Synopsis/Reviews" menu 108 and the "View Movie Trailer" menu 109.

FIG. 17 is a flow chart summarizing the operational process in the event finder of the present invention for finding the movie theater and the movie in the embodiment of FIGS. 13–16. The operation starts after selecting "Destination" in the main menu (not shown). Thus, in the destination selection menu such as shown in FIG. 8A, the user selects "Point of Interest" at step 301.

Then, at step 302, the event finder (navigation system) displays the screen 92 shown in FIG. 8B which lists input methods for finding a point of interest. The list includes the event finder menu, in this example, the "Movie Finder" menu. The user selects the "Movie Finder" menu so that, at step 303, the event finder displays the screen 93 of FIG. 8C listing search methods for finding the move. The search methods include the "Movie Name", "Movie Theater" and "Top Ranked Movies" menus.

The user selects the "Movie Theater" to specify the movie theater name, which leads the event finder to show the keyboard screen 94 of FIG. 8D. When the user inputs the movie theater name such as "AMC", at step 304, the event finder displays the move theater screen 146 showing the list of movie theaters "AMC". Typically, the movie theaters are sorted by the distance from the user's current vehicle position. As shown in FIG. 14, the move theater screen 146 shows the name, address and phone number of the selected movie theater. The movie theater screen 146 also includes the "Movie List" menu for each movie theater.

The user selects the "Movie List" menu for the selected movie theater at step 305. Thus, the event finder displays a movie list screen 152 or 162 which lists the movie names shown in the selected movie theater as shown in FIG. 15 or 16, respectively. If the user selects the movie "X-Men" in the movie list screen 152, the event finder moves to the movie preview screen 112 of FIG. 9.

In step 306, the user selects one of the movie theaters, which results in the "Confirm Destination" screen 132 of FIG. 11. If the information in the confirmation screen 132 matches the destination that the user wants to go, she selects "OK to Proceed" at step 307. Then, at step 308, the navigation system calculates appropriate routes to guide the user to the selected destination, i.e, the movie theater, and changes the display to a route guidance screen.

As has been described above, according to the present invention, the event finder is capable of easily obtaining information on the events and event locations associated with current position of the user with high efficiency and flexibility. The event finder allows the user to find event information, displays such information, and guides the to reach the event location where the selected event takes place. The event finder facilitates communication between the navigation system and the data server through the wireless communication.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. An event finder for finding event information, comprising:
   a display;
   a data terminal connected to the display which processes data based on a program;
   a navigation system which determines a position of a user using the data terminal and a position of a destination; and
   a transceiver which receives event data from a remote event data server through a public communication system, where the event data server is a service provider which provides event information including schedules of events to unlimited numbers of subscribed members;
   wherein the data terminal associates the event data from the event data server with position information from the navigation system and retrieves event information based on a search method specified by the user to display the retrieved event information on the display; and
   wherein, when the event data is movie data and a movie name is specified, the data terminal retrieves movie information and displays the movie information on the display, and wherein the displayed information includes a menu for finding movie theaters which show the specified movie.

2. An event finder as defined in claim 1, wherein the transceiver and a wireless communication service provider establish wireless communication therebetween, thereby receiving the event data from the event data server through the public communication system.

3. An event finder as defined in claim 1, wherein the transceiver is an Internet receiver connected to a communication cable of the public communication system to receive the event data through Internet and stores the event data in a memory device, and wherein the data terminal retrieves event data from the memory device and processes the event data in combination with the position information.

4. An event finder as defined in claim 1, wherein the transceiver is a wireless communication device, and wherein the transceiver, the data terminal, and the navigation system are incorporated in a portable navigation system, thereby enabling the navigation system to receive the event data from the remote event data server and to search and display the event information in connection with the position of the user.

5. An event finder as defined in claim 1, wherein the transceiver is a wireless communication device, and wherein the transceiver, the data terminal and the navigation system are implemented as a vehicle navigation system installed in a vehicle of the user, thereby enabling the vehicle navigation system to receive the event data from the remote event data server and to search and display the event information in connection with the position of the user and the destination.

6. An event finder as defined in claim 1, wherein the transceiver is a wireless communication device, and wherein the transceiver, the data terminal and the navigation system are implemented in a hand held computer, thereby enabling to receive the event data from the remote event data server and to search and display the event information in connection with the position of the user.

7. An event finder as defined in claim 1, wherein, when the user selects the menu for finding the movie theater, the data terminal causes to display a list of theaters sorted by distance which show the selected movie, and wherein a start time and a wait time of the selected movie with respect to one of the theaters are displayed along with the information on the theater.

8. An event finder as defined in claim 1, wherein, when a movie theater is specified, the data terminal retrieves the movie information on the specified movie theater which is displayed on the display, and wherein the displayed information includes a list of movies shown in the specified theater.

9. An event finder as defined in claim 8, wherein, when the user selects one of the movies listed on the display, the data terminal causes to display movie information on the selected movie which includes at least a start time thereof.

10. A method for finding an event, comprising the following steps of:
    receiving event data from an event data server through a communication network;
    displaying a selection menu for finding event information in the event data wherein the selection menu includes an event name menu and an event location menu;
    selecting either the event name menu or the event location menu in the selection menu and specifying a name of desired event or event location;
    when the event name is specified, displaying detailed information on the selected event name including a start time of the event, and further displaying a menu for finding event locations playing the selected event;
    when the event location is specified, displaying detailed information on the selected event location including an address of the event location and a prospective arrival time based on a current position of a user, and further displaying a menu for finding event names played in the selected event location;
    selecting one of the event locations as a destination;
    calculating a route to the destination and guiding the user to arrive the destination.

11. A method for finding an event as defined in claim 10, wherein the step of displaying the detailed information on the selected event name further includes a step of displaying a summary of the event, preview of the event, or an image of the event.

12. A method for finding an event as defined in claim 10, wherein the step of displaying the event locations further includes a step of sorting the event locations based on differences of distance from the current position of the user.

13. A method for finding an event as defined in claim 10, wherein the detailed information on the selected event location includes a list of start times of the selected event, a prospective arrival time of the user to the event location determined based on positions of the user and the event location, and a wait time for a next start time of the selected event.

14. A method for finding an event as defined in claim 10, wherein the step of displaying the detailed information on the selected event location further includes a step of displaying a ticket pricing, theater attendance, or purchase advance ticket screen.

15. A method for finding an event as defined in claim 10, wherein the step of receiving the event data from the event data server includes a step of receiving the event data through wireless communication.

16. A method for finding an event as defined in claim 10, wherein the step of receiving the event data from the event data server includes a step of receiving the event data through communication cable using Internet and storing the event data in a memory device, and wherein the step of selecting the event name or event location includes a step of retrieving the event data from the memory device.

* * * * *